July 6, 1965  B. C. MILLER  3,192,711

NOZZLE POSITION AND AFTERBURNER LIGHTING INDICATOR

Filed Nov. 29, 1962　　　　　　　　　　　　　　　　2 Sheets-Sheet 1

INVENTOR
BOB C. MILLER

BY Claude Funkhouser
ATTORNEY
Cornelius J. Husar
AGENT

A/B FUEL ON

1

United States Patent Office 3,192,711
Patented July 6, 1965

2

3,192,711
NOZZLE POSITION AND AFTERBURNER
LIGHTING INDICATOR
Bob C. Miller, San Gabriel, Calif., assignor, by mesne assignments, to the United States of America as represented by the Secretary of the Navy
Filed Nov. 29, 1962, Ser. No. 241,092
5 Claims. (Cl. 60—35.6)

This invention relates to apparatus for use with afterburner structures of jet-type aircraft power plants. More specifically the invention relates to an indicating device and associated equipment for providing indications as to the position of the movable nozzle surfaces of the afterburner structure.

Afterburner nozzles for jet aircraft generally fall within one of two general categories. One such type of afterburner variable nozzle structures utilizes what are known as clam shell variable nozzles while an alternate type in common use is referred to as the iris diaphragm type. While the instant invention may be utilized with the actuating mechanisms for either of the aforementioned types of variable nozzle structures, for purposes of simplicity the structure will be described herein as relating to an afterburner of the iris diaphragm type. In this latter type afterburner nozzle a series of plates or leaf-type elements are arranged about the periphery of the afterburner structure at the rear of the jet power plant and are located at the aft or exhaust exit portion thereof. The leaves are generally provided with actuating apparatus which effects a pivoting action of the various leaves to reduce the effective nozzle area and hence the peripheral or exhaust end diameter of the nozzle. In the wide open condition of the leaf-type structure the peripheral area or circumference of the exhaust terminal end of the afterburner is substantially wide open or at its greatest area condition. Various instrumentalities have been used in prior art afterburners for actuating the individual leaves, either individually or in an arrangement coupling a plurality of leaves in a manner to effect a synchronized movement thereof and thereby maintain uniformity of the shape of the orifice at the closure or exit portion of the nozzle. These actuating instrumentalities frequently incorporate devices which are generally arranged forwardly of the afterburner structure along the outer housing of the power plant and for purposes of illustration are herein considered as linearly actuated mechanisms. In the simplest form thereof a linearly movable hydraulic cylinder and piston arrangement is coupled through two linkage elements to an actuator for the afterburner variable area nozzle leaf elements.

Prior art indicating arrangements for sensing the instantaneous position of the leaf structure of the variable nozzle elements have incorporated linkage arrangements which are actuated as the nozzle structure is moved in a manner to reduce or increase the exist area of the afterburner nozzle. These devices have incorporated linkage or follow-up members which are attached to or are moved in a follower relationship with the movement of the nozzle elements. Such an arrangement necessitates the placing of a portion of the linkage in intimate contact with the leaf structure. The leaf or plate structures are subjected to intense heat which is due to the combustion of exhaust products, fuel and gases resulting from fuel burning action occurring downstream from the afterburner fuel jets and in adjacency to the afterburner nozzle. This intense heat tends to introduce errors in the indications provided by conventional type indicators as the temperature rises or drops along the surface of the nozzle leaf elements. Such temperature changes are also induced into the linkage elements of the indicating devices. Hence, due to the rising or falling temperature of the plates as the exit area is increased or decreased with increased heating and subsequently decreased with a slight lowering of the exhaust temperatures, inaccuracies occur in the response of the indicating devices.

It is a feature of the instant invention to obtain an accurate indication of the position of the exhaust nozzle which indication is unaffected by temperature changes in the afterburner or indicating structure.

One object of the instant invention resides in the provision of apparatus for obtaining an accurate positional response and if desired a visual indication of exhaust nozzle position by referencing the position of the nozzle flaps or leaves to the outer cage of the afterburner housing by correlating the null position to the mid-travel position of the nozzle flaps.

In correlation with the foregoing object it is a further object to provide apparatus capable of providing either a series of indications or a continuous indication of the instantaneous position and changes in position of the flaps both prior to afterburner ignition and subsequent to afterburner ignition by virtue of improved indicating devices thereof.

Another object of the instant invention resides in the sensing of afterburner nozzle flap positions at the null condition of the sensing device under operating conditions and which is correlative to the mid-travel position of the nozzle elements.

Still another object of the instant invention resides in the provision of a new and novel appartus for sensing the position of the nozzle flaps wherein temperature changes in the synchronization ring or other flap actuating apparatus for the outer cage of the afterburner nozzle which is of a character to affect nozzle's effective area dimensions will be detected by the instant apparatus.

In correlation with the immediately foregoing object, it is a further object to detect movement of the flaps of the afterburner nozzles by transmitting indications of movement thereof by means of a drive gear and rack combination of a character and so disposed as to rotate a shaft for driving a potentiometer and/or other accurate flight nozzle position indicating devices which are capable of providing the additional function of providing nozzle position signals for indication of afterburner lighting.

Still another object of the invention resides in the provision of a new and novel device incorporating a drive gear and rack combination for transmitting movement indications of the relative position of the nozzle flaps which device is of a character providing a minimization of errors due to temperature change occurring in the indicator actuating mechanisms thereof.

Other objects and many of the attendant advantages of this invention will be more readily appreciated from the following detailed description of the invention when considered in conjunction with the accompanying drawings wherein.

Figure 1:
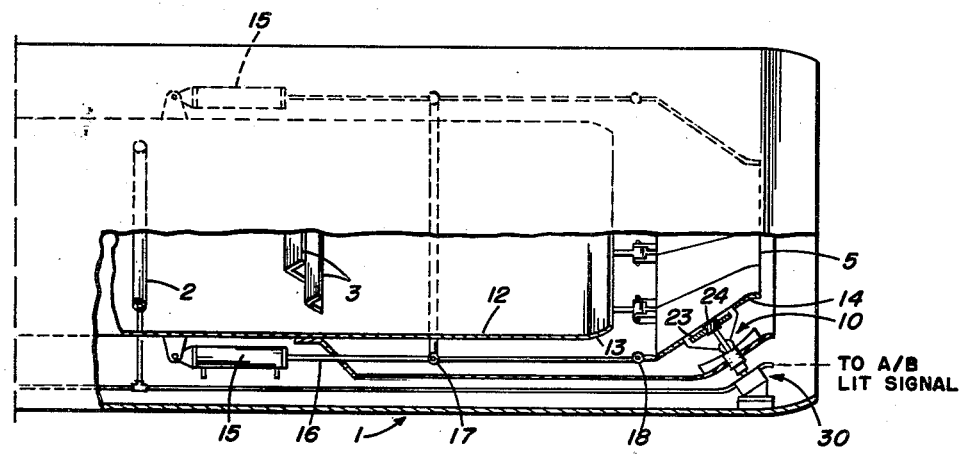
FIG. 1 is a diagrammatic illustration of the afternburner section of a jet engine showing the relative positions of the afterburner, flameholder, exhaust nozzle, etc.

Referring now more particularly to FIG. 1 of the drawings there is shown the afterburner region 1 of a jet engine having fuel spray bars 2 and flameholder 3. Also a plurality of hydraulic actuators are shown at 15 for actuation of the exhaust nozzle 5. The nozzle incorporates a plurality of leaves or flaps 14. The nozzle position indicator is shown generally at 10. The afterburner light indicator portion thereof is shown generally at 30. The details of each of the aforementioned devices is described hereinafter in greater detail.

Figure 2:
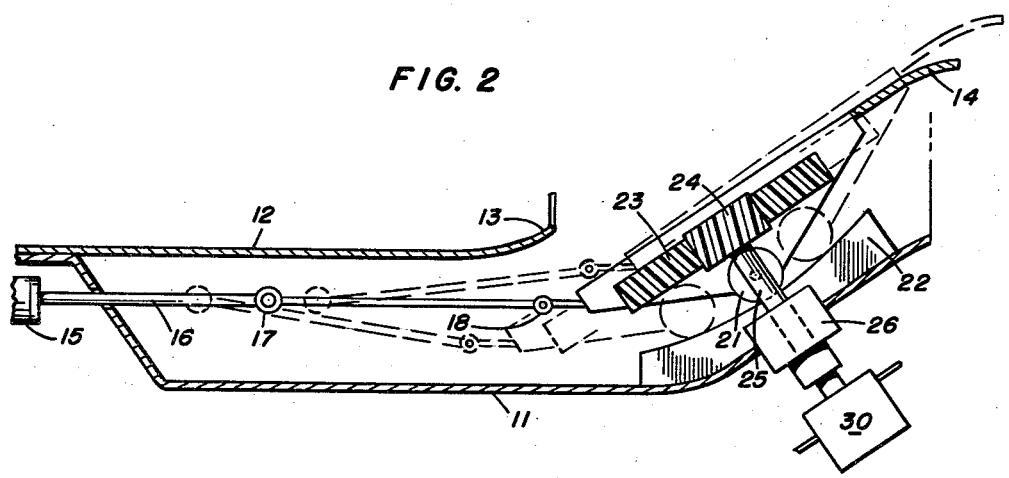
FIG. 2 is a generally diagrammatic illustration of the structure of an actuator mechanism and sensing or nozzle position indicating output device of a preferred embodiment of the instant invention.

In FIG. 2 of the drawings there is shown a fragmentary view of a portion of the afterburner structure of an aircraft jet-type power plant of the character embodying the improved indicating and sensing and signal transmitting arrangements of the instant invention. The afterburner outer case is indicated at 11. This outer case surounds the afterburner liner which is concentrically disposed therein as indicated at 12. A flap or iris diaphragm leaf member is disposed in spaced adjacency to the terminal portion 13 of the afterburner liner as indicated at 14. The actuating mechanism for the flap 14 includes an actuator piston which may be of a hydraulically actuated two way piston and cylinder arrangement as indicated at 15 and of a character well-known in the art. A piston is connected to a connecting or actuator rod 16 which is in turn connected by means of a pivot or clevis means at 17 to provide a movement of the coupling or intermediate link rod which has the opposite ends thereof connected to a second pivot or clevis means 18. The clevis means 18 is fixedly attached to the supporting structure 19 of the flaps 14. The flap further incorporates a roller element disposed as indicated at 21 which follows a cam ramp or block 22 which is contoured substantially as shown. The elements of this arrangement are designed to provide the predetermined desired flap closing characteristics when the flap is caused to respond and move in correlation with movement of the roller as the roller moves along the roller ramp in response to movement of the intermediate linkage element. The composite arrangement or mechanism is thus caused to move in response to actuation of the actuator connecting rod 16. The flap structure further carries a toothed rack member 23 along the under surface thereof which is suitably disposed and arranged for engagement with a mating gear pinion 24 in a manner to effect a drive thereof. The pinion 24 in turn is attached to the indicator output shaft 25. Suitable bearings of a character well-known in the art are mounted at 26 in the outer case to permit the fixation of the shaft in a manner permitting only rotational movement thereof. As the roller 21 moves along the roller ramp 22 the pinion and rack configuration is such as to permit a slight upward or downward change in the engaging surface positions which occur relative to the rack and pinion. The design of the gear teeth and the angle of engagement therebetween is so selected as to permit what in effect amounts to a slight sliding relationship therebetween as the relative positions thereof change during actuation thereof. The arrangement is advantageously positioned to have its normal position at the midpoint of the flap movement and the structure is of a nature to assume a temperature correlative to that of the temperature of the interior surface of the flap 14 and of sufficient mass to become relatively heat stabilized. The mid-position of the flap 14 is shown in solid lines while the increased and decreased opening of the flap 14 is shown in broken lines. It is to be noted that the movement of the second clevis means 18 is arcuate rather than linear. The reason for this is the fact that the roller 21 rides on the cam block 22, therefore the locus of any point on the surface of the flap with movement of the flap 14 will be arcuate as shown. As the flap 14 is actuated between closed and open positions a shaft rotation or analogue response is provided at the terminal end of the shaft. This shaft may be used to drive a sensing potentiometer in a well-known manner, as shown at 10 in FIG. 3, or preferably to drive an afterburner light indicator and positional response signal transmitter of the character shown in FIG. 3.

Figure 3:
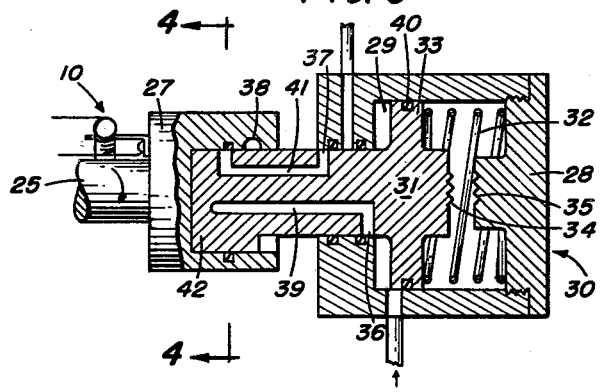
FIG. 3 is a diagrammatic view in section of a position indicating and afterburner lighting indication signal transmitting device, illustrated in its no light position, of the character adapted for use with the structure of FIG. 1.

In the case where the output shaft 25 is arranged to drive a coupling or an indicating device of the character of FIG. 3 the output end thereof is terminated in a rotary cylinder or valve supporting device indicated at 27. It is to be understood that the novel indicator disclosed herein is a preferred type converter device. However, other types of signal converters may be used without departing from the scope of the instant invention. Piezoelectric crystal transducer, variable reluctance or moving coil converter are merely examples of a variety of types which may be used if desired.

Figure 7:
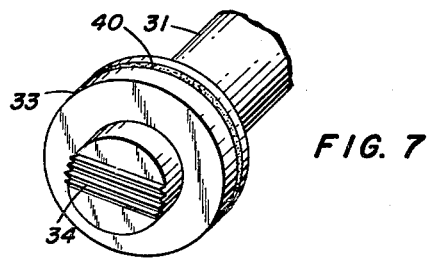
FIG. 7 is an end view of the piston portion of the indicator illustrating typical serrations on the extreme end thereof.

The housing 28 of the afterburner lighting position indicator or signal transmitter 30 is provided with a cylindrical well portion 29. This housing carries a linearly movable piston 31 having a coil spring 32 disposed between the bottom of the stepped well and an annular flange surface 33 of the piston 31 which moves within the cylindrical well. The larger end of the piston is provided with an annular groove to accommodate an O-ring 40. The interior terminal end of the piston is provided with a series of generally V-shaped grooves or serrations 34 as shown in detail in FIG. 7, which are so disposed as to mate with similarly configured serrations 35 provided across the face of the stepped surface at the rear of the housing. The linearly movable piston 31 is provided with a series of ports indicated at 36 and 37 for providing fluid communication between an inlet port in the housing for admission of afterburner fuel and for permitting flow therefrom when the fuel under pressure is communicated into the inlet chamber whereby a communication path is established between the aforementioned port and the fluid passages 39 and 41 in the piston. The application of pressurized afterburner fuel at the inlet will effect an axial movement of the piston against the action of the spring 32 to seat the piston in a manner when whereby the serrations 34 of the piston engage the serrations 35 in the housing to preclude any tendency toward rotation of the piston. Additionally, it provides for movement of the piston with respect to the output end of the shaft valving ports whereby an aligned condition as to the planes of the terminal ends of the ports 36 and 37 will be accomplished.

Figure 4:
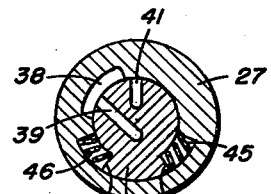
FIG. 4 is a sectional view taken along the axis 4—4 of FIG. 3.

Referring now additionally to FIGS. 3 and 4 it will be observed that when the piston is seated in the aforementioned rearwardly disposed position and assuming the central or normally disposed position of the flaps, passages 39 and 41 will be blocked by virtue of the valve closure surface of the outer cylinder of the valve 27. The elongated port 38 is configured to permit a flow of afterburner fuel between the inlet conduit 39 of the piston 31 and the exit conduit 41 of the piston 31 which is placed in fluid communication with the outlet port 37 in the housing 28 when the aforementioned piston is in its forwardly disposed position. The configuration of the lower portion of the piston 31 is as shown at 42 to include a pair of surfaces 43 and 44 which are normally in a null position with respect to the terminal end of the output shaft, as shown in FIG. 4, by means of springs 45 and 46 disposed between suitably disposed spring backing surfaces in the valve output cylinder valve structure 27.

Figure 5:
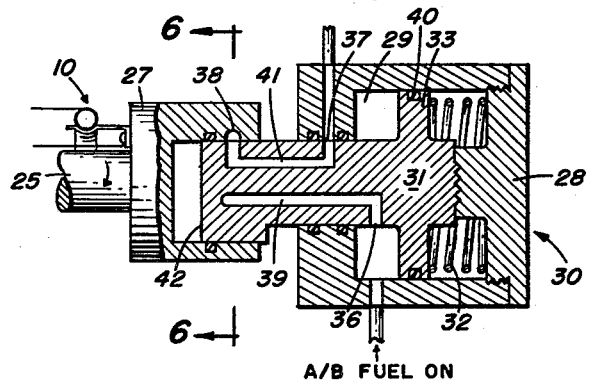
FIG. 5 is a diagrammatic view similar to that of FIG. 3 showing the position indicating and afterburner lighting indication signal device in its afterburner lighted position.
Figure 6:
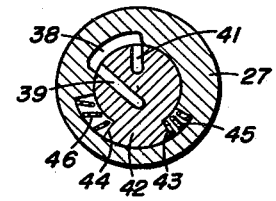
FIG. 6 is a sectional view taken along the line 6—6 of FIG. 5 illustrating the position of the ports of the valve portion of the indicator when in the afterburner lighted position thereof.

Accordingly, in operation of the device a movement of the flap by virtue of its actuation of the linearly movable actuator effects movement of the rack and accomplishes a rotation of the gear 24 and the gear coupled shaft 25. This movement will displace the valving portion of the output cylinder to provide fluid communication between the passages 39 and 41 of piston 31 thereby effecting flow of afterburner fuel through the valve block sensing device, as shown in FIGS. 5 and 6, to a remote hydraulic signal indicator or hydraulic-to-electrical transducing means for providing a light or other suitable electrical signal indicative of the aforementioned movement. The structure of the inlet portion of the cylinder of the sensing unit 30 will be more apparent from further consideration of FIG. 5. The normal condition of the afterburner lighting indicator and sensing position transmitter is shown at FIG. 3 wherein the inlet port 47 is blocked off by the action of the spring 32 against the flange and valving portion 42 of the piston 31. It will be further noted that the port 47 is displaced linearly along the housing and likewise with respect to the output valving block end of the sensing shaft 25.

FIG. 6 illustrates the position of rotary valve 27 with respect to the valving portion 42 of the piston 31. As shown, afterburner fuel or other suitable hydraulic fluid flowing contemporaneously with the flow of afterburner fuel enters port 36, flows through passage 39, through elongated port 38, through passage 41 and exits through outlet port 37.

The operation of the sensing device in its normal manner of indication of flap position is deemed apparent from the foregoing description. It is a further operational function of this device to indicate the condition wherein the afterburner has become ignited after admission of afterburner fuel thereto. When the fuel supply has been pressurized and the sensing and indicating valve actuated, the flow of fuel by means of a bypass conduit will inject fuel into the interior of the afterburner in adjacency to igniters thereof of a character well-known in the art.

When the fuel is ignited it will produce a temperature change in the afterburner which will reflect as a distortion or heating of the flaps to provide incremental movement thereof. This movement hence will be coupled back to the rack to provide an indication of the rotation of the shaft which will transmit a pressure change signal through the output shaft of the afterburner connected elements thereof to produce a flow indication at the outlet port 37 of the afterburner lighting indicator device 30. This indication is then transmitted to a remote station on the aircraft, i.e., the pilot's compartment by instrumentalities previously described herein.

Obviously many modifications and variations of the present invention are possible in the light of the above teachings. It is therefore to be understood that within the scope of the appended claims, the invention may be practiced otherwise than as specifically described.

What is claimed is:

1. In combination with a jet engine having an afterburner, an afterburner outer casing, an afterburner fuel system, an exhaust nozzle and means for varying the area of said nozzle, the improvement comprising means operably connected to said nozzle for indicating the position of said nozzle, means for indicating the presence or absence of a condition of ignition and/or combustion in the afterburner, said last mentioned means thereby indicating an afterburner lighted or ignited condition, said last mentioned means comprising a rack which is fixedly secured to one of the flaps of said nozzle, a roller operably attached to said nozzle flap, cam means fixedly secured to said afterburner outer casing, said roller being in mating contact with said cam means, a pinion gear driven by said rack, a shaft operably connected to said pinion gear, valve means located at the terminal end of said shaft, piston means having an upper portion operatively mounted within said valve means, passages in said piston to permit flow therethrough when said valve means is in position to interconnect said passages, resilient means located between said valve means and said upper portion of said valve means urging said valve means into an unaligned position, a housing surrounding the lower end of said piston means, an inlet and outlet in said housing, the lower end of said piston means being of larger diameter than said other end, locking means in said piston and housing for preventing rotation of said piston with respect to said valve means and said housing, biasing means located between the lowermost end of said piston means and said housing wall for urging said piston means into the forward position thereof, thereby preventing flow from said housing inlet to said housing outlet via said passages in said valve means when said piston means is subjected to pressure overcoming said biasing means, said piston means functions to move a distance sufficient to align said passages with said ports in said housing as the temperature in the nozzle area increases due to the increased flow of heated gases from said afterburner, the leaves of said nozzle displaying an inherent characteristic of expanding sufficiently to cause said rack to move, thereby forcing said pinion to rotate the shaft and rotary valve thereon whereby as said valve rotates the passages in said piston means are interconnected by said rotary valve thus permitting flow therethrough to indicate a successful afterburner ignition.

2. A device of the character described in claim 1 wherein said cam means comprises an arcuately shaped cam block which determines the path of said rack.

3. A device of the character described in claim 1 wherein said valve means comprises a cylindrical member having a recess in its lower end, and an elongated port integral with said recess to provide interconnection of said passages in said piston means.

4. A device of the character described in claim 3 wherein said resilient means for urging said valve means into an unaligned position comprises a plurality of springs which are mounted against flanges in the wall of said recess and said upper portion of said piston means.

5. A device of the character described in claim 1 wherein said locking means for preventing rotation of said piston with respect to said valve means and said housing is formed by a plurality of V-shaped serrations in the lowermost end of said piston means and the end wall of said housing whereby said serrations on said piston means engage the serrations on said end wall thereby preventing rotation of said piston.

References Cited by the Examiner

UNITED STATES PATENTS

| | | | |
|---|---|---|---|
| 2,789,417 | 4/57 | Kuzmitz. | |
| 2,955,412 | 10/60 | Rhodes | 60—35.6 |
| 2,972,858 | 2/61 | Pavlick | 60—35.6 |
| 2,974,480 | 3/61 | Kurti | 60—35.6 |

FOREIGN PATENTS 768,042   5/55   Germany.

SAMUEL LEVINE, *Primary Examiner.*

ABRAM BLUM, *Examiner.*